United States Patent [19]
Lindén

[11] Patent Number: 4,715,122
[45] Date of Patent: Dec. 29, 1987

[54] PLASTIC HANDLE SCISSORS

[75] Inventor: Olavi Lindén, Billnäs, Finland

[73] Assignee: Fiskars Oy AB, Helsinki, Finland

[21] Appl. No.: 912,317

[22] Filed: Sep. 29, 1986

[51] Int. Cl.$^4$ .............................................. B26B 13/02
[52] U.S. Cl. ...................................... 30/254; 30/266
[58] Field of Search .......... 30/244, 253, 254, 256–260, 30/266, 267

[56] References Cited
U.S. PATENT DOCUMENTS

| | | | |
|---|---|---|---|
| 1,632,284 | 6/1927 | Gardiner | 30/257 |
| 2,284,664 | 6/1942 | Kissling | 30/260 X |
| 2,626,460 | 1/1953 | Wahl | 30/266 |
| 3,735,763 | 5/1973 | Shannon et al. | 30/254 X |
| 4,250,620 | 2/1981 | Nishikawa | 30/254 |

Primary Examiner—E. R. Kazenske
Assistant Examiner—Michael D. Folkerts
Attorney, Agent, or Firm—James E. Nilles

[57] ABSTRACT

The invention relates to a pair of scissors and a mould and a method for the manufacture of a pair of scissors. The scissors comprise two scissor blades of metal, a ceramic material or the like, and two plastic handle portions which both form a tongue positioned on the outer surface of the blade and surrounding the scissor hinge. By virtue of variation in the position of the hole of the blade, through which hole the scissor hinge goes, the points of the blades and the counter faces of the handle portions must be finished manually. This can be avoided if at least one hole has a larger diameter than the outer diameter of the hinge pin so that the bearing surfaces formed by the tongues can, if necessary, be placed eccentrically with respect to the hole of the blades.

4 Claims, 4 Drawing Figures

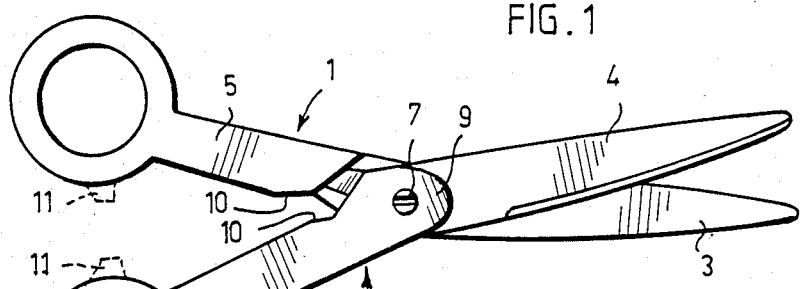
FIG. 1
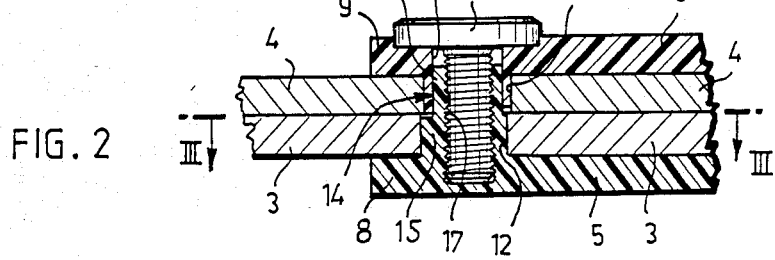
FIG. 2
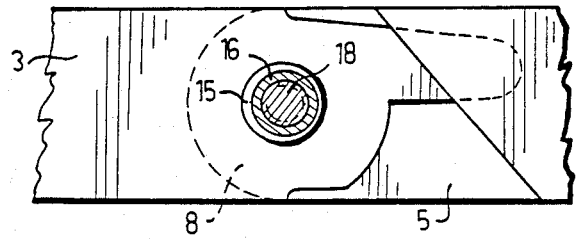
FIG. 3
FIG. 4
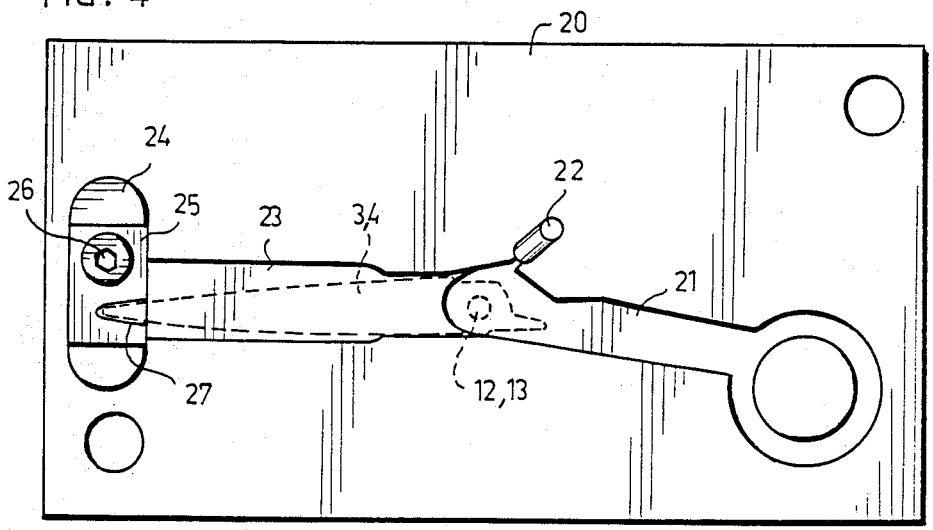

PLASTIC HANDLE SCISSORS

BACKGROUND OF THE INVENTION

The present invention relates to a pair of scissors comprising two scissor halves connected by means of a hinge member, each half comprising a scissor blade of metal, a ceramic material or the like, and a plastic handle portion connected to the blade, said handle portion forming a tongue positioned on the outer surface of the blade and surrounding the scissor hinge, whereby the hinge member extends from the tongue of one scissor half through holes provided in the scissor blades to the tongue of the other scissor half and is surrounded in at least one tongue by a bearing surface which bears against the hinge member. The invention is also concerned with a mould and a method for the manufacture of scissor halves.

In the manufacture of scissors constructed as described above, blades of metal, a ceramic material or the like are manufactured first, whereafter cutting edges are ground in the blades and they are provided with a hole for the scissor hinge. The blade is thereafter positioned in a space provided therefor in a die-casting mould and is fixed in position with respect to the mould by means of a pin or the like which goes through the hole of the blade and which is secured to the mould surfaces. This blade space communicates with a mould cavity for the handle portion, which cavity is filled with a fluid plastic material during the manufacture of the scissor half, whereby the plastic material partially surrounds that end of the blade which is adjacent the hinge so that the blade is fastened to the handle portion. Finally, two scissor halves are connected with each other by means of a screw or a rivet which goes through a boring formed by the mould pin through the scissor blades and the tongues of the handle portion.

Since the mould pin, which forms the boring, equals in diameter with the hole of the scissor blade, the holes of the scissor blades are fixed in the right position with respect to the mould and the plastic loop of the handle portion so that the two parts of the boring will be positioned in alignment, which, of course, is necessary in order that the hinge member could be passed into the boring.

It is generally known that the position of the hole in a scissor blade varies within certain limits. This implies that the distance between the center of the hole and the point of the scissor blade as well as between the center of the hole and the cutting edge of the blade varies from blade to blade. When two scissors halves are connected with each other to form a pair of scissors, it often turns out that the points of the blades protrude to different extent and/or the points do not make contact as required when the scissors are closed. The disadvantages are nowadays eliminated by means of a manual finishing, whereby the longer point can be ground shorter and, correspondingly, the position of the mutual stop faces of the handle portions are adjusted. These steps, however, must be carried out manually, wherefor they greatly affect the price of the scissors.

SUMMARY OF THE INVENTION

The object of the present invention is to enable scissors to be manufactured without any subsequent finishing treatment, simultaneously maintaining the present tolerances for the position of the hole in the scissor blade. The scissors according to the invention are characterized in that at least that portion of the hinge member which is positioned in the hole of one of the scissor blades has a smaller diameter than said hole.

As a result of the difference in diameters between the hinge member and the hole of the scissor blade, the edge of the hole does not bear against the hinge member; instead, the position of the hinge member is determined solely by the bearing surface in the tongue of the handle portion. Consequently, it is not necessary to fix the position of the blade with respect to the mould, and thus also with respect to the handle portion, on the basis of the position of the hole. This enables the blade to be fixed in position in the mould by means of e.g. the point of the blade so that the distance between the point of the blade and the hinge member is always the same, because both the point and the bearing surface provided for the hinge member in at least one tongue are determined by the mould. As the blade thus can be positioned as desired with respect to the handle portion, i.e. no attention has to be paid to the position of the hole in the blade, the distance between the center of the hinge and the point of the blade as well as between the center and the cutting edge of the blade can always be given the same precise dimension, whereby the finishing becomes unnecessary.

According to one preferred embodiment of the invention, the hinge member is formed by a pin projecting from one tongue, and that portion of the pin that is positioned in the hole of one scissor blade has a diameter equal to that of the hole while the portion positioned in the hole of the other scissor blade has a smaller diameter than the hole. In this case the hinge member is thus formed of the same material piece as one of the plastic tongues, which makes the structure simple. Accordingly, the pin of the hinge member can wholly fill the hole in that blade against which the tongue forming the pin is positioned.

In order to fasten the scissor halves to each other, and in order to provide the pin with a sufficient strength, the pin is preferably provided with a central boring for fastening means. The boring is thereby preferably threaded so that it can receive a screw.

In order to provide the scissors with a suitable stiffness it is of advantage that the diameter of the threading is underdimensioned with respect to the screw.

In order to obtain the largest possible bearing surface for the hinge pin, it is of advantage that the bearing surface(s) of the hinge member extend(s) into the hole of the scissor blade.

In view of the tolerances presently applied to the position of the hole in the blade, it is preferable that the diameter of the hinge member is 75 to 90 percent, preferably 80 per cent, of the diameter of the hole of the scissor blades. A sufficient clearance is thus provided for the hinge pin within the hole of the blade.

The invention is also concerned with a mould for the manufacture of a scissor half comprising a scissor blade of metal, a ceramic material or the like, and a plastic handle portion connected to the blade, said mould being provided with a space for the scissor blade, a mould cavity connected with said space for the formation of the handle portion by means of injection moulding, and means for fixing one point of the blade with respect to the mould during the injection moulding.

The fastening means in known moulds are formed by a pin which is secured to at least one wall of the mould and which goes through the hole of the blade. As the pin equals in diameter with the hole of the blade, the position of the hole is fixed with respect to the mould. Since the distance between the center of the hole and the point of the blade as well as between the center of the hole and the cutting edge of the blade varies, the scissors must, as mentioned above, be finished manually, which brings about costs.

In order to eliminate the manual finishing, one aspect of the invention is a mould which is characterized in that the fixing means of the scissor blade are positioned at the point of the blade for the fixing thereof.

In the mould according to the invention, the position of the blade is thus fixed with respect to the mould not on the basis of the position of the hole but with the point of the blade as a point of reference. Further, if the bearing surface(s) of the hinge member is (are) formed in a substantially known manner by means of pins fastened to the mould, the distance between the hinge member and the points of the blades in a pair of scissors will always be equally large. Since the distance of the hole from the point of the blade varies, the hole must have a larger diameter than the hinge member so that the hinge member can, if required, take an eccentric position with respect to the hole of the blade.

It is of advantage in view of the manufacture of the different scissor models that the fastening means are formed by a replaceable part of the mould at that end of the space provided for the scissor blade which receives the point of the blade. This replaceable part can be e.g. a block of metal provided with a slot for the blade point.

For fastening the blade to the mould in the transverse direction of the blade, too, it is advantageous that the blade is fixed to the mould in the transverse direction of the blade by the edges of said space.

The invention is also concerned with a method for the manufacture of a pair of scissors comprising two scissor halves, each comprising a scissor blade provided with a hole and made of metal, a ceramic material or the like, and a plastic handle portion connected to the blade, in which method a scissor blade is placed in a space formed in a mould, one point of the blade is fixed with respect to the mould, and a plastic material is extruded into a mould cavity communicating with said space for the formation of the handle portion and in order to simultaneously fasten the handle portion to the scissor blade, whereafter two scissor halves formed as described are connected with each other by means of a hinge member going through the hole of the blades.

In prior methods, the scissor blade is fastened to the mould by means of a pin secured to the mould and going through the hole of the scissor blade, having the same diameter as the hole. The pin makes a transversely extending boring which, in a pair of scissors, goes through the blades and the plastic tongues of the handle portion. The disadvantages connected with this technique, i.e. the required finishing of the scissors, can be avoided by means of the method according to the invention, which is characterized in that the hole of the scissor blade is provided with a diameter which exceeds the diameter of the hinge member, and that the point of the scissor blade is fixed with respect to the mould.

On account of the larger diameter of the hole of the scissor blade in comparison with the diameter of the hinge member, it is not necessary to determine the position of the hinge member in accordance with the position of the hole, but it is determined by the mould, which also determines the position of the blade point. Accordingly, the distance between the hinge member and the blade point will always be constant, and the finishing becomes unnecessary.

BRIEF DESCRIPTION OF THE DRAWINGS

A preferred embodiment of the invention will be described in more detail below with reference to the attached drawing, wherein FIG. 1 shows a pair of scissors according to the invention, FIG. 2 is an enlarged sectional view of the hinge point, FIG. 3 is a section along the line III—III shown in FIG. 2, and FIG. 4 shows one half of a mould for the manufacture of scissor halves.

DESCRIPTION OF PREFERRED EMBODIMENT

The pair of scissors shown in FIG. 1 comprises two scissor halves 1 and 2, each of which is formed by a scissor blade 3 and 4 respectively which is made of metal, a ceramic material or the like, and a handle portion 5 and 6 respectively which is made of a plastic material. The scissor halves 1, 2 are connected with each other by means of a hinge 7. The scissor blades 3, 4, in turn, are connected with the handle portions in such a manner that the handle portions partially surround one end of the blades. The handle portions are further provided with a tongue 8 and 9 respectively which are positioned against the outer surface of the blades and which surround the hinge 7. The handle portions are also provided with stop faces 10 facing each other so as to limit the closing movement of the scissors. These stop faces can, if desired, be replaced with projections 11 of the loops themselves, as shown in FIG. 1 by the broken lines.

FIG. 2 shows the structure of the hinge 7 on an enlarged scale. In FIG. 2, the holes of the blades 3, 4 are provided with the reference numerals 12 and 13 respectively. It is to be seen from the figure that the plastic material which forms the handle portion 5 and the tongue 8 thereof penetrates into the holes 12, 13 of the blades in the form of a hinge pin 14 which extends up to the outer side of the blade 4. The hinge pin 14 is formed by two portions, whereby the portion 15, which is positioned closest to the tongue 8 in the blade 3, has an outer diameter corresponding to the diameter of the hole 12, and the portion 16, which is positioned farther away from the tongue 8 in the blade 4, has an outer diameter which is smaller than the diameter of the hole 13. The hinge pin 14 is provided with a longitudinal boring 17 which is closed at the tongue 8 but open at the free end of the pin and which is preferably threaded for receiving a screw 18. As the head of the screw is positioned against the outer surface of the tongue 9, it serves as connecting means for the scissor halves. At the same time it provides the necessary support for the hinge pin 14, which is made of a plastic material.

In principle, the space between the narrower portion 16 of the hinge member and the edges of the hole 13 could be open; however, it is advantageous for reasons of strength and stability that the tongue 9 of the handle portion 6, which tongue is provided with a through hole the walls of which form a bearing face 19 for the portion 16 of the hinge pin, extends into the hole 13 so that the portion 16 of the hinge pin is positioned against the bearing face 19 over the whole length thereof.

It appears from FIG. 2 that because the portion 16 of the hinge pin has a smaller diameter than the hole 13 of the blade, it is not necessary for the blade 4 to be positioned with respect to the hinge pin portion 16 with the help of the hole 13 in the blade 4, but the blade 4 can be positioned in such a manner with respect to the hinge pin portion 16 that the distance between the center line of the portion 16 and the point of the blade and between the center line and the cutting edge of the blade is equally large in both scissor halves 1, 2 irrespective of the position of the hole 13 in the blade 3. A similar effect is obtained with respect to the blade 3.

FIG. 4 shows one half of a mould for the manufacture of a scissor half. A surface 20 of the mould half is provided with a recess 21 which together with a substantially similar recess in the other mould half forms a mould cavity for the handle portion and which communicates with a feeding conduit 22 for a fluid plastic material. The recess 21 communicates with a shallower recess 23 which defines a space for a scissor blade 3, 4 together with the surface of the other mould half, the space being indicated by a dot-dash line.

On the left in FIG. 4, the recess 23 adjoins the recess 24, in which a metal block 25 is fastened by means of a screw 26. The metal block 25 is provided with a V-shaped slot 27 at that side thereof which faces the recess 23, said slot corresponding to the form of the point of the scissor blade. The mould is further provided with pins and/or recesses (not shown) within the area of the holes 12, 13 of the blade in order to form the plastic formations shown in FIG. 2 at the scissor hinge.

For the manufacture of one scissor half, a blade 3, 4 is placed in the recess 21 in the manner shown in FIG. 4, whereby the point of the blade is positioned against the walls of the slot 27, and the side edges of the blade are positioned against two opposite walls in the recess 23 in the vicinity of the blade hole 12, 13. The blade is thus fixed with respect to the mould both in the longitudinal and transverse directions thereof. Thereafter the mould halves are brought together, and the plastic material is injected into the recess 21 so that the handle portion 5, 6 is formed, and the plastic material adheres to the blade 3, 4.

Since the blade is fixed with respect to the mould by means of the point thereof and two opposite longitudinal edges, the hinge pin 14 is formed at a point which is eccentric as compared with the hole 12, 13 of the blade, if the hole is not positioned at the right place. This eccentricity, whereof an example is shown in FIGS. 2 and 3, does not negatively affect the operation or the strength of the scissors. It is noted that this eccentricity requires that the hole 13 be larger than the diameter of the hinge pin 16.

After the manufacture of two scissor halves, the portion 16 of the hinge pin is passed into the hole of the tongue 9 and the screw 18 is screwed in place. As a result of the way of manufacture according to the invention, the scissor blades are always equally long, and the points overlap each other to a desired degree without any subsequent adjustment of the stop faces.

Even though the embodiment shown in the figures should be the most advantageous one, it is to be noted that the same effect can be obtained e.g. by means of a rivet which goes through the scissors and is positioned against the bearing faces of the tongues 8, 9. The screw 18 can be replaced by some other suitable metal member. In general, a sufficient diameter of the portion 16 of the hinge pin would be 75 to 90 percent, preferably 80 percent, of the diameter of the hole 13. It is also of advantage that the diameter of the threading is underdimensioned with respect to the screw 18.

What is claimed is:

1. A scissors comprising two scissors halves which have a hinged connection with one another that disposes each said scissors half with an inner surface thereof adjacent to the other and an opposite outer surface thereof remote from the other, each said scissors half comprising an elongated blade member of metal or the like and a plastic handle member fixed to the blade member, said blade member having a blade portion which extends along one part of its length to a tip at one of its ends and on which there is a cutting edge and having a connecting portion which extends along another part of its length to an opposite end thereof and in which there is a hole for said hinged connection, and said handle member being formed in one piece and having a tongue which embraces the connecting portion of the blade member around the outer surface thereof, said scissors being characterized by:
  A. the tongue of the handle member of one of said scissors halves having a male hinge element formed in one piece therewith that comprises
    (1) a base portion which fills said hole in said one scissors half and
    (2) a cylindrical pin portion
      (a) which is of substantially smaller diameter than said base portion,
      (b) which projects axially beyond the inner surface of said one scissors half and a substantial distance into said hole in the other scissors half, and
      (c) the axis of which is at predetermined distances from said tip and from said cutting edge of said one scissors half; and
  B. the tongue of the handle member of said other scissors half being formed to provide a female hinge element that cooperates with said cylindrical pin portion to provide said hinge connection, said tongue of said other scissors half having a bore therein that defines a cylindrical bearing surface
    (1) wherein said pin portion is received with a close but rotatable fit and
    (2) the axis of which is at predetermined distances from said tip and from said cutting edge of said other scissors half.

2. The scissors of claim 1, further characterized in that:
said female hinge element comprises a protuberance portion of the tongue of the handle member of said other scissors half that substantially fills said hole in said other scissors half and wherein said bore is formed.

3. The scissors of claim 1, further characterized by:
(1) said pin portion having a concentric threaded bore therein that opens axially towards the outer surface of said other scissors half, and
(2) a screw received in said threaded bore and having an enlarged head which overlies the tongue of the handle member of said other scissors half to confine the scissors halves in hingedly connected relationship.

4. A scissors comprising two scissors halves which have a hinged connection with one another that disposes each said scissors half with an inner surface thereof adjacent to the other and an opposite outer surface thereof remote from the other, each said scissors half comprising an elongated blade member of metal or the like and a plastic handle member fixed to the blade member, said blade member having a blade portion which extends along one part of its length to a tip at one of its ends and on which there is a cutting edge and having a connecting portion which extends along another part of its length to an opposite end thereof and in which there is a hole for said hinged connection, and said handle member being formed in one piece and having a tongue which embraces the connecting portion of the blade member around the outer surface thereof, said scissors being characterized by:

A. the tongue of the handle member of each said scissors half having a portion which is formed in one piece therewith that substantially fills said hole in the scissors half;

B. one of said scissors halves having a cylindrical bore in said portion of its tongue which (1) opens axially towards the other scissors half,
(2) is of substantially smaller diameter than said hole in said one scissors half, and
(3) has its axis at predetermined distances from said tip and from said cutting edge of said one scissors half; and C. said other of said scissors halves having a cylindrical pin projecting axially from the said portion of its tongue which substantially fills said hole and received in said cylindrical bore with a close rotatable fit, said pin
(1) being of substantially smaller diameter than said hole in said other scissors half and
(2) having its axis at predetermined distances from said tip and from said cutting edge of said other scissors half.

* * * * *